United States Patent Office 3,451,181
Patented June 24, 1969

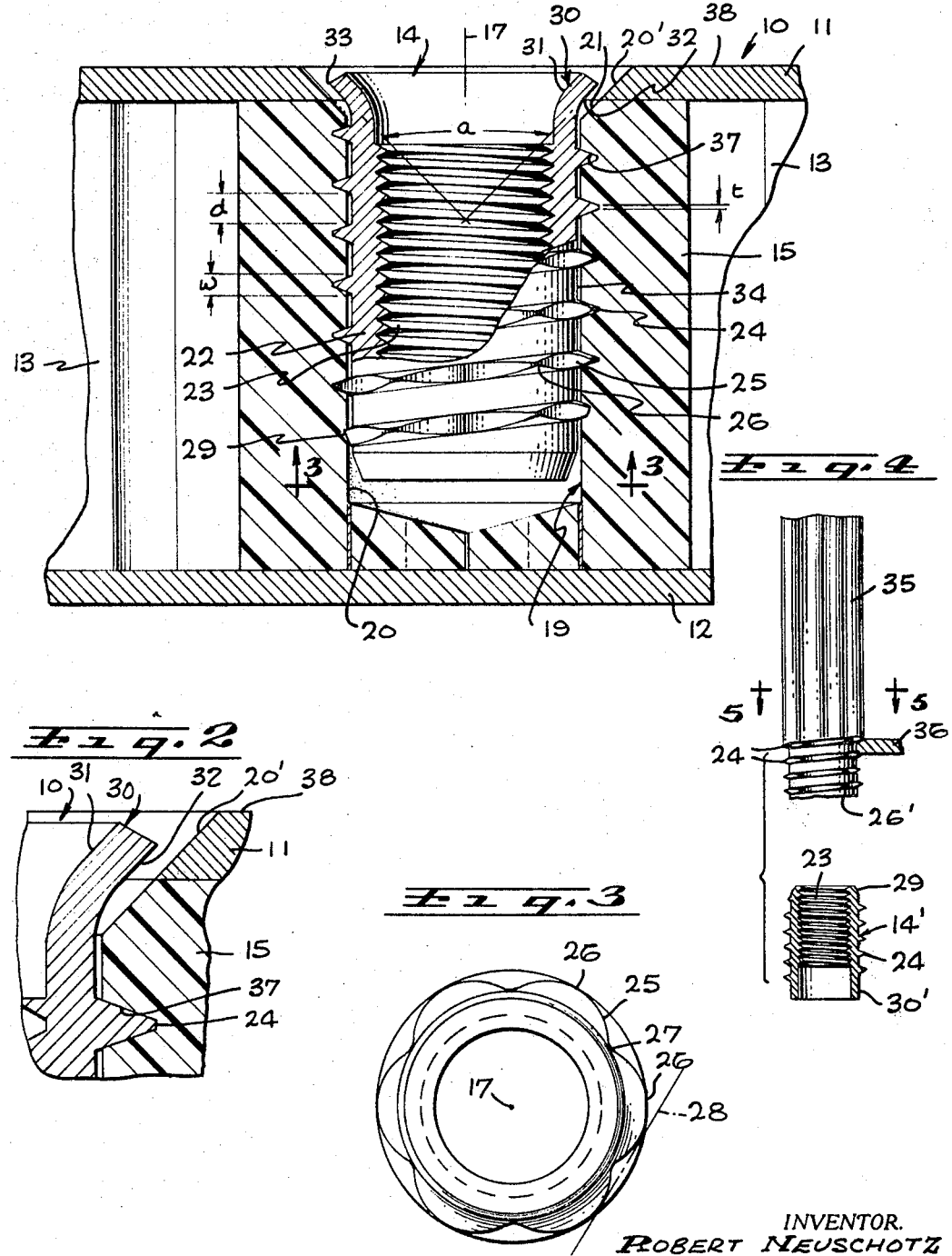

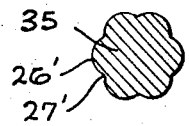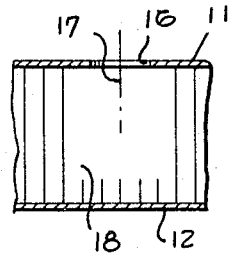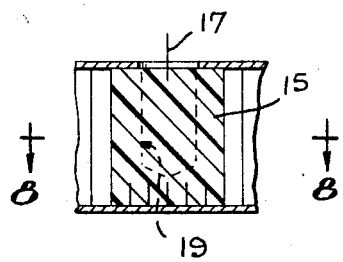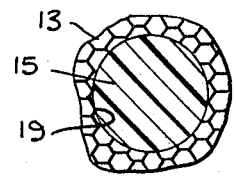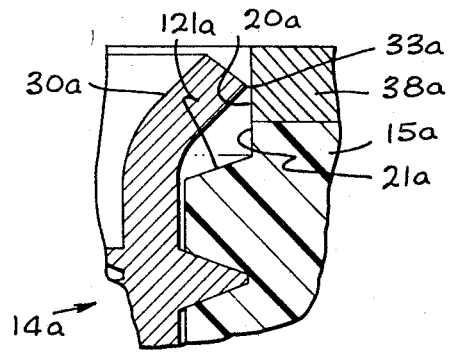

3,451,181
HONEYCOMB STRUCTURES CONTAINING THREADED INSERTS
Robert Neuschotz, 1162 Angelo Drive, Beverly Hills, Calif. 90210
Filed Aug. 29, 1967, Ser. No. 664,063
Int. Cl. E04b 2/28; E04c 2/36; F16b 35/00
U.S. Cl. 52—617                                8 Claims

ABSTRACT OF THE DISCLOSURE

An assembly including a honeycomb structure having two skins and an intermediate honeycomb core, with a resinous plastic material filled in between the skins at a predetermined location, and with a threaded fastener screwed into the plastic material. The fastener has self tapping and self locking external threads, and has a flange at one end of the threads flaring outwardly to an increased diameter and received within an opening in one of the skins, in close proximity to an edge of the skin which forms that opening, to restrain the fastener against transverse movements relative to the honeycomb structure. The fastener is formed from stock of externally non-circular shape, giving to the external threads a corresponding non-circular peripheral configuration, and with the flange initially being formed at a reduced diameter, and then being deformed radially outwardly to an increased diameter.

Background of the invention

This invention relates to the structure, use, and method of forming threaded fasteners, such as internally and externally threaded inserts, to be screwed into a carrier structure for the purpose of enabling connection of another screw or other threaded part to the carrier structure through the medium of the insert or its equivalent.

When an insert is to be connected into a structure of the type referred to as a "honeycomb" structure, such as is utilized widely in forming walls and other parts of aircraft, difficulty may be encountered in so mounting the insert as to assure transmission in most effective manner from the insert to the honeycomb structure of load forces to which the insert may be subjected in use. This may be especially true of shear strain forces exerted transversely of the axis of the fastener threads. Such difficulty in maximizing the effectiveness of force transmission to the honeycomb structure results largely from the fact that this structure, though so designed as to have a very high strength to weight ratio, is nevertheless formed of component parts which individually have relatively little strength, this being particularly true of the usually very thin gauge material from which the core of the honeycomb structure is formed. Thus, unless shear forces and the like are transmitted to the components of the honeycomb arrangement effectively, the insert may be able to work its way loose from the honeycomb structure under the influence of vibratory and other forces encountered in use, to thus destroy the effectiveness of the connection through the insert to the honeycomb assembly.

Summary of the invention

In an assembly constructed in accordance with the present invention, the insert or fastener is screwed into a body of resinous plastic material or other anchoring material located between the two skins of the honeycomb structure, and at a position at which the core of the honeycomb material has been locally removed to provide for reception of the anchoring substance, and with the insert having a flange at one end of its external threads extending radially outwardly and received within an opening formed in one of the skins of the honeycomb assembly. This flange desirably flares radially outwardly into close proximity to the edge formed by the skin of the honeycomb structure and defining the opening. When transverse or shear strain forces are then exerted against the insert in use, the flange is able to bear radially or laterally against the skin, about the opening, in a manner effectively locating the insert and preventing substantial lateral displacement thereof. Thus, the entire insert and any screw or other fastener connected thereto, are effectively located relative to the honeycomb structure, and all load forces are properly transmitted to the honeycomb structure in optimum fashion. For best results, the opening in the skin is so formed as to provide a countersink surface which extends essentially parallel to and in proximity to the flaring outer surface of the flange of the insert.

Certain additional features of the invention relate to a preferred method of forming the insert or fastener in a manner giving the external threads a self tapping and self locking characteristic of the type disclosed and covered in my United States Patent No. 3,200,691. For this purpose, the insert is desirably formed from an elongated piece of stock having a predetermined non-circular external cross sectional configuration, so that when the stock is threaded the external threads will have a corresponding non-circular shape providing the threads with alternate peaks and reduced radius areas which function to tap or roll the threads in the mating plastic material as the insert is installed, and which also function to lock the insert against unscrewing rotation after installation. The flange of the device preferably does not have this non-circular cross section, and therefore is initially formed at a reduced diameter, and is then deformed or flared radially outwardly to an increased diameter final condition.

Brief description of the drawing

The above and other features and objects of the invention will be better understood from the following detailed description of the typical embodiment illustrated in the accompanying drawing, in which:

FIG. 1 is a vertical section through an assembly including an insert and a honeycomb structure in the relationship contemplated by the present invention, and with the insert being shown partially in elevation;

FIG. 2 is a greatly enlarged fragmentary representation of a portion of FIG. 1, at the location of the end flange of the insert;

FIG. 3 is a view taken on line 3—3 of FIG. 1, but showing only the insert and not the surrounding honeycomb structure;

FIG. 4 is a somewhat diagrammatic representation of the manner in which a series of the inserts of FIG. 1 are formed from an elongated piece of stock;

FIG. 5 is a transverse section taken on line 5—5 of FIG. 4;

FIGS. 6 and 7 show a honeycomb structure at two successive stages during its preparation for reception of the insert of FIG. 1;

FIG. 8 is a section taken on line 8—8 of FIG. 7; and

FIG. 9 is an axial section through a variational arrangement.

Description of the preferred embodiment

In FIG. 1, I have shown at 10 a conventional honeycomb structure such as is utilized widely in forming aircraft wings, wall structures, components, etc. This structure includes two typically parallel and typically planar sheet metal "skins" 11 and 12, which may for example be formed of aluminum or other suitable material, with a honeycomb core 13 received between the two skins and interconnecting them. The honeycomb core is formed of strips or pieces of this sheet metal, foil or other sheet material extending between the two skins 11 and 12, and defining a honeycomb cross section such as that indicated at 13 in FIG. 8. These various pieces of sheet metal forming the core are of course welded or otherwise secured to one another, and to the skins, to intergrate the entire structure into a unitary assembly having a high strength to weight ratio.

In the honeycomb structure 10 of FIG. 1, there is mounted a threaded insert 14, which is connected into a body of essentially rigid resinous plastic material 15 carried by the honeycomb structure at a localized area. To allow for reception of the resinous plastic anchoring material 15, the upper skin 11 of the honeycomb material may first be drilled to provide a circular opening 16 in it centered about an axis 17 extending perpendicular to the two skins, following which a routing tool may be inserted downwardly through opening 16 into the interior of the honeycomb assembly, and be moved about in a manner locally cutting away or routing out some of the core material to the condition of FIG. 6, to provide an essentially circular or cylindrical space 18 centered about axis 17 and of a diameter greater than the diameter of opening 16. The resinous plastic material 15, typically an epoxy, is filled into the space 18 in uncured form, and is then polymerized to a hardened condition as seen in FIG. 7. After polymerization or curing of the anchoring material 15, a passage 19 is drilled in the resinous plastic material, as indicated in broken lines in FIG. 7 and in full lines in FIG. 1, with this passage defining a cylindrical internal wall surface 20 in the plastic material centered about axis 17. At the upper end of wall surface 20, there is machined an annular upwardly flaring countersink surface 20' in upper skin 11, and a continuation 21 of this countersink surface in the resinous plastic material, with both of the countersink surfaces 20 and 21 being centered about axis 17, and preferably tapering at an included angle of between about 70 and 100 degrees, for best results approximately 90 degrees.

The insert 14 has an essentially tubular body 22 formed of an appropriate rigid metal such as steel, and containing internal threads 23 into which an externally threaded screw or stud may be connected for the purpose of securing that screw or stud to the honeycomb structure 10 through the medium of the insert. Threads 23 may be a standard thread, in order to receive a screw having completely standard external threads.

Externally, the body 22 of insert 14 preferably has a self tapping and self locking outer thread 24, which is desirably of the peaked and recessed type disclosed and claimed in my prior Patent No. 3,200,691. More specifically, these threads 24 have radially outer surfaces 25 which face radially outwardly and which advance alternately toward and away from axis 17 as they advance circulrly about that axis, to give the threads 24 the peripheral shape illustrated in FIG. 3, having alternate peaks 26 formed at the maximum diameter portions of surface 25, and circularly intermediate reduced radius valleys or recesses 27 between the peaks. The peaks are outwardly convex, as shown, with each of the reduced radius areas 27 being recessed radially inwardly beyond a plane such as that illustrated at 28 in FIG. 3 and drawn to just touch two adjacent peaks. At the axially inner or lower end of the insert 14, threads 24 are further truncated by formation of a chamfer surface 29 (FIG. 1) on the insert, centered about and tapering frusto-conically with respect to axis 17, to facilitate initial advancement of the thread 24 into the resinous plastic material 15. At its upper end, the side wall of body 22 of the insert forms an annular radially outwardly flaring flange 30 defined by parallel radially inner and outer annular surfaces 31 and 32 which preferably flare at an angle $a$ (FIG. 1) corresponding essentially to the angle of flare of countersink surfaces 20 and 21. The radially outermost annular edge 33 of flange 30 projects outwardly beyond the minor diameter surfaces 34 of external threads 24, and preferably projects to a diameter closer to the major or maximum diameter of threads 24 (and peaks 26) than to minor diameter surfaces 34. In the optimum arrangement of FIG. 1, the diameter of edge 33 is equal to, or substantially equal to, the maximum peak diameter of threads 24. It will also be noted that the minor diameter surfaces 34 of threads 24 are modified in character, that is, do not correspond to the minor diameter of standard threads, but rather extend cylindrically through a greater than standard axial distance $d$ which exceeds the axial extent $t$ of the thread peaks 26, and preferably exceeds the maximum axial thickness $w$ of each turn of the threads 24.

FIG. 4 illustrates the manner in which a series of the inserts 14 are preferably formed from an elongated piece of metal stock 35 having the peaked and recessed cross section illustrated in FIG. 5. It will be noted that this external cross section of the stock 35 corresponds to the previously discussed peripheral configuration of the outer surface or surfaces 25 of threads 24 in FIG. 3, and in particular has alternate peaks 26' and recesses 27' corresponding to the peaks and recesses 26 and 27 respectively of FIG. 3. Stock 35 is initially of a length corresponding to the combined length of a series of the inserts 14, so that several successive inserts may be formed from the same rod. As indicated at the lower end of the stock 35 in FIG. 4, the threads 24 are formed on the outside of the stock by merely advancing along the outside of the stock, as the latter turns, a conventional thread chaser or thread forming tool 36, so positioned and shaped as to form the minor diameter surfaces 34 and to cut the threads in a manner such that the outer surface of stock 35 forms the waving outer surface 25 of thread 24. When first machined, the insert 14 may be of the shape illustrated at 14' in the lower portion of FIG. 4, in which the external threads 24 are chamfered at 29 as previously described, and in which internal threads 23 are formed as in FIG. 1, but with the end portion 30' which will ultimately form flange 30 being internally and externally of straight cylindrical configuration, and with the outer surface of this portion 30' desirably being af a diameter corresponding to the minor diameter 34 of threads 24. After the insert has been formed to the condition illustrated at 14' in FIG. 4, portion 30' of the element is annularly deformed radially outwardly from its straight cylindrical condition to the outwardly flaring condition of FIG. 1, to form the annular flaring flange 30. Thus, even though the flange 30 may ultimately project radially outwardly to a position as far out as the maximum diameter peaks 26 of threads 24, the flange does not have the peaked and recessed cross sectional configuration of the initial stock 35, but rather is completely annular because of its initial formation in the condition illustrated at 30' in FIG. 4.

The insert 14 is installed within the honeycomb structure 10 of FIG. 1 by merely screwing threads 24 downwardly into passage 19 in the resinous plastic material 15, with the peaks 26 of threads 24 acting to progressively roll or form mating internal threads 37 in the plastic material, and acting in the final installed condition of FIG. 1 to resist or prevent unscrewing rotation of the insert from that FIG. 1 position. The insert is advanced to a position in which it is essentially flush with or slightly beneath the upper surface 38 of top skin 11, but in which flange 30 is definitely located within and radially opposite countersink surfaces 20 of skin 11. Surface 32 of the flange 30 may be in direct engagement with countersink surface 20 of skin 11, or may be (and preferably is) spaced slightly from that countersink surface as indicated in FIG. 1.

A mating screw or stud is attached to the insert by screwing it into internal threads 23, to connect another part to the FIG. 1 assembly. In the event of exertion of excessive forces against the insert through the screw and transversely of axis 17, those forces are taken partially by the resinous plastic material 15, and partially by engagement of surface 32 of flange 30 with countersink surface 20 of skin 11, to thus definitely limit such transverse motion of the insert. Also, the flange 30 gives to the overall assembly of FIG. 1 a neat and pleasing appearance as viewed from the outside of skin 11.

FIG. 9 is a view similar to FIG. 2, showing a variational form of the invention in which there is formed in skin 38a (corresponding to skin 38 of FIG. 1) a straight cylindrical counterbore surface 20a, in lieu of the countersink surface 20 of FIG. 1. This cylindrical counterbore 20a is centered about an axis such as that shown at 17 in FIG. 1, and defines the opening within which flange 30a of insert 14a is received. The insert 14a may be identical with the insert 14 of the first form of the invention, and have its annular radially outer edge 33a received in close proximity to or in engagement with counterbore 20a. The resinous plastic anchoring material 15a may be shaped to form a continuation of counterbore surface 20a at 21a, and to then form an annular frustoconical surface 121a, with all of the surfaces 20a, 21a, and 121a being formable simultaneously by a single drilling operation utilizing a bit of appropriate configuration.

As in the first form of the invention, the reception of flange 30a of insert 14a in FIG. 9 within the opening formed by the counterbore surface 20a serves to enable effective transmission of shear strain forces from the insert to skin 38a and the remainder of the honeycomb structure, and additionally provides an assembly having a neat and attractive appearance from the outside of the honeycomb.

I claim:

1. The combination comprising a honeycomb structure including two spaced skins and sheet material in a honeycomb pattern extending between said skins, said sheet material being removed from a predetermined localized area, a mass of anchoring material in solid form received and carried in fixed position between the skins at said localized area and containing a bore extending into said material generally perpendicular to said skins, and a fastener connected into said bore in the anchoring material and including a body having external threads engaging internal threads in the bore, means carried by said body forming a second set of threads to which a coacting part may be connected to secure said part to the honeycomb structure through said fastener and said anchoring material, said external threads being truncated in a relation forming on the threads, as they advance circularly about the axis of the threads, alternate radially outwardly projecting self tapping and self locking peaks and intermediate reduced radius regions, said peaks being shaped to tap said internal threads in the wall of said bore as said body is screwed thereinto, and to then lock the body against unscrewing rotation from said bore, said body having an essentially annular flange axially outwardly of said self tapping and self locking external threads and at least partially located axially outwardly of said anchoring material and which is received within an opening in one of said skins, said flange extending radially outwardly into close proximity to or engagement with said one skin within said opening and radially opposite the wall of said opening in a relation confining the flange and body against substantial lateral movement within the opening and thereby resisting lateral displacement of said external threads relative to said anchoring material.

2. The combination as recited in claim 1, in which said wall of said opening forms a flaring countersink surface, said flange being flared generally in correspondence with and in close proximity to said countersink surface.

3. The combination as recited in claim 1, in which said flange has a radially outer surface in close proximity to or engagement with said wall of said opening and which flares radially outwardly from approximately the minor diameter of said external threads to approximately their major diameter but not far beyond the latter.

4. The combination as recited in claim 1, in which said anchoring material is a resinous plastic material molded in place between said skins.

5. The combination as recited in claim 1, in which said fastener body is a generally tubular insert, and said second set of threads are internal threads formed in the body.

6. The combination as recited in claim 1, in which said wall of said opening is essentially cylindrical, said flange being flared into close proximity to said cylindrical wall.

7. The combination as recited in claim 1, in which said flange has flaring generally parallel radially inner and outer surfaces, said outer surface flaring from approximately the minor diameter of said external threads to approximately their major diameter but not far therebeyond, said anchoring material being a resinous plastic material molded in place in the honeycomb structure, said body being a generally tubular insert, said second set of threads being internal threads formed in the body radially opposite said external threads, said inner surface of the flange flaring from approximately the major diameter of said internal threads to a diameter between the major and minor diameters of said external threads.

8. The combination as recited in claim 1, in which said flange flares at an included angle of between about 70 and 100 degrees.

References Cited

UNITED STATES PATENTS

| | | | |
|---|---|---|---|
| 2,444,145 | 6/1948 | Rosan | 151—41.73 |
| 2,639,179 | 5/1953 | Phelps | 151—41.73 |
| 2,967,593 | 1/1961 | Cushman | 151—41.7 |
| 3,054,436 | 9/1962 | Rosan | 151—41.73 |
| 3,200,691 | 8/1965 | Neuschotz | 85—47 |
| 3,282,015 | 11/1966 | Rohe et al. | 52—704 |

FOREIGN PATENTS

| | | |
|---|---|---|
| 1,254,770 | 1/1961 | France. |
| 812,540 | 4/1949 | Great Britain. |
| 902,147 | 7/1962 | Great Britain. |

MARION PARSONS, Jr., *Primary Examiner.*

U.S. Cl. X.R.

10—27; 151—41.7